Patented Sept. 16, 1941

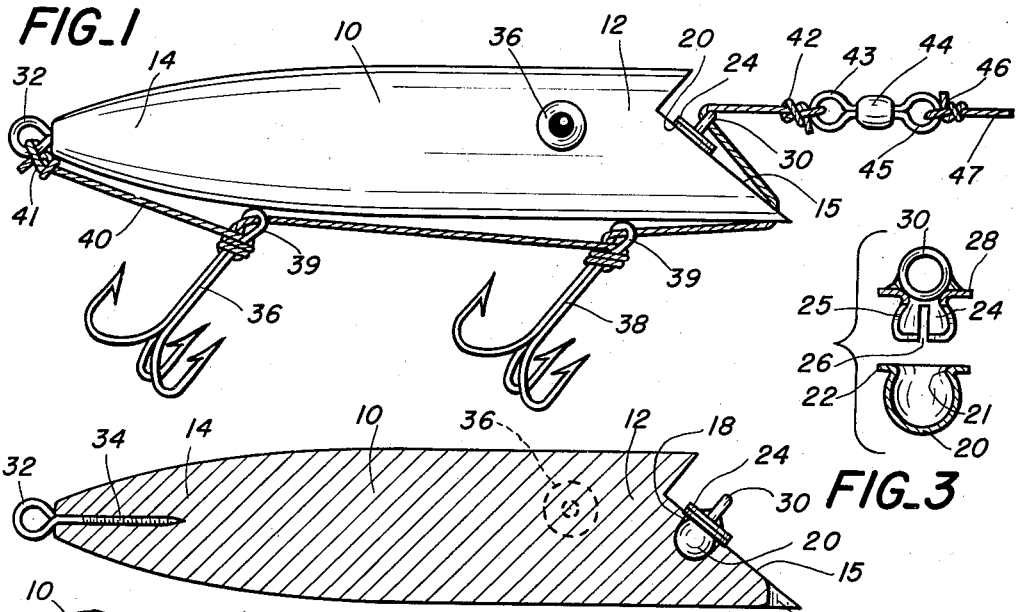

2,256,173

UNITED STATES PATENT OFFICE 2,256,173

ARTIFICIAL MINNOW PLUG

Otto Schechterle, Seattle, Wash.

Application September 25, 1940, Serial No. 358,197

10 Claims. (Cl. 43—46)

This invention relates to improvements in an artificial minnow plug and is particularly directed to means for cooperatively attaching hooks to such types of fish lures.

Previous practices in the manufacture of such artificial fish lures has entailed the fixed or swiveled attachment of multiple pronged hooks to the body of the lure in such a manner that they dangle in one general position and are readily subject to injury or dislodgment during the times when the plug is used in fishing. The hooks, which are usually treble or double hooks, have previously been secured to the body of the lure by screw eyes, eye bolts, staples or other types of clips in such a manner that while the hooks can swing or swivel, they could not be revolved freely upon their securing means.

When a fish is hooked on such gear, experience has taught that it is able to obtain a leverage against the hook so that by threshing or violently shaking the lure to dislodge the hook from its mouth, it is enabled to twist the hook against the lure to either break a hook out of the lure or dislodge the hook from its mouth.

Another disadvantage of having the hook permanently fixed or swiveled is that it is not readily replaced when it may become weakened through rust or corrosion. Certain previous attempts have been made to solve the problems outlined above, by altering the manner of mounting the hooks on the plug body. Such prior developments have usually entailed the detachable mounting of the hooks on the plug body so that when the lure is "struck at" by the fish, the barbs of one or both hooks are engaged in the fish. In these cases the mounting means will dislodge itself from the lure body to permit the hook to freely engage the fish without being fixed or swiveled on the plug. The artificial minnow in these prior instances of development is disposed ahead of the fish, and will supply an appreciable drag or interference in the water as the fish is being maneuvered or played while being landed.

By the use of my invention I believe I have overcome many objections to the above-mentioned methods of securing the hook to the lure. I provide a hook mounting means which is intimately associated with the fishing line by which the lure is drawn through the water, which means is secured to the plug body when the lure is "set" to dispose the hook below the body of the wooden minnow; at the same time, when the plug is struck and a hook is lodged in a fish, the mounting means will be readily dislodged or disengaged from the lure body and the drag of the fish will be taken directly on the fishing line without retarding interference from the lure body. The elimination of such interference is an appreciable gain and due to the fact that that body is trailing through the water rearwardly of the point where the hook or hooks engage the fish.

By the use of my invention I also provide means whereby, when the fish is caught on one of the barbs of a multiple number of hooks used, the other one may be positioned to additionally gaff him to provide a further or auxiliary securing arrangement.

An important object of my invention is to provide in connection with a plug body attaching means for a plurality of hooks which means may be easily and detachably engaged on the artificial minnow body.

Another object of my invention resides in the provision of hook attaching means for artificial minnow bodies, which means are intimately associated with the fishing line so that when a fish is hooked on a barb or barbs, the minnow body will be disposed rearwardly of the hooks and out of the way, to facilitate the landing of the fish.

A further object of my invention has been to provide simple, efficient means for attaching a multiple barbed fish hook employed in connection with a minnow body to that body easily and simply by means of spring acting retention members to facilitate the "setting" and dislodging of the lure and its hook.

Other and more specific objects and advantages of my invention will be apparent during the course of the following description, taken in connection with the accompanying drawing, wherein I have shown a preferred form of my invention and in which like numerals indicate like parts throughout the same.

In the accompanying drawing:

Figure 1 is a side elevational view of an artificial minnow after the teachings of my invention, showing the manner in which the hooks are detachably arranged in connection with the body during the fishing operation, Figure 2 is a longitudinal medial sectional view of the lure of Figure 1, but with the hook attaching means disconnected therefrom.

Figure 3 is an exploded view of the spring actuated retention members employed in securing the fish hook attaching means to the lure of Figure 1, Figure 4 is a fragmentary perspective view of the right end of the lure of Figure 1, Figures 5 and 6 are fragmentary sectional views of the right end of Figure 2, showing the retention members of Figure 3 in the partially inserted position in Figure 5 and the fully inserted position in Figure 6, Figure 7 is an exploded perspective view of the retention devices of Figure 3, but showing them in an inverted position, and Figure 8 is a view showing a fish as though hooked by the barbs of two multiple pronged hooks and with the lure trailing in the manner permitted by the principles of my invention.

The reference numeral 10 designates a minnow body or plug body of the conventional type, which may be formed of wood, plastic, or any other suitable material and which has the head end 12 and the tail end 14. In the illustrations in the drawing the head end 12 is shown as notched and having the principal sloping face 15, in the lower edge of which is formed the guide notch 16. In the face 15 I provide a cavity 18 into which may be cemented the female retainer member 20. The member 20 is provided with the restricted throat 21 and it may also have the annular flange 22. The male member comprises the head 24 having crossed notches 25 and 26. Member 24 will be preferably formed of resilient material so that an outwardly acting tension is provided. I have shown the member 24 as having an annular flange 28, and the outstanding lead eye or ring 30 for a purpose later to be described.

The two members 20 and 24 engage together in the manner shown in Figure 5 and for the purpose of this description it may be assumed that in Figure 4 the member 24 is being inserted into the member 20. In that case the cross notches 25 and 26 permit the partial collapsing of the head 24 against its normal resiliency so that it will pass through the throat or restricted area 21 of the member 20.

In Figure 6 the male member is securely positioned within the female member 20 and the head 24 has been permitted to expand in close intimate contact within the female member. Thus is formed a secure grip or snap fastening for the two elements. In that case, flange 28 lies in close or juxtaposed relation to flange 22. The eye 30 then stands outwardly or upwardly from the face 15 of the plug body.

On the tail or trailing end of the lure I provide anchor means such as an eye or loop 32 which, in Figure 2, is shown as a part of a screw eye having a shank 34. Any other manner of fastening would, of course, be suitable, the important consideration being the provision of line anchoring means.

For the purpose of adding to the lifelike appearance of the lure the conventional artificial eyes 36 are employed, usually one disposed on each side of the plug body adjacent the head end.

In Figures 1 and 5 I have shown associated with the plug body 10 a pair of multiple barbed fish hooks 36 and 38 each of which members has an eye 39. In order to attach the hooks 36 and 38 to the plug body I employ a strand of auxiliary line 40 which at 41 is knotted or otherwise secured to the eye 32. By forming loops or bights intermediate of the line in connection with the eye 39 of the hook 36, that hook may be positioned adjacent the rear or tail end of the fish lure body. In a similar manner the hook 38 is attached to the line 40. The leading end of the line is then engaged in the guide notch 16 in the head end of the plug body and is threaded through the loop or eye 30 of the member 24. The forward or leading end of the line may then be knotted at 42 to an eye 43 of a swivel 44. Usually such swivels are provided with a secondary eye 45 to which is knotted or secured at 46 the main trolling line 47.

It will be apparent of course that the use of the swivel 44 is not absolutely necessary and is merely indicated here to illustrate one manner of eliminating the unnecessary twisting to which lines of this nature may sometimes be subjected. In other words, the line 40 may be an integral part of the line 47, instead of as shown in Figure 1.

It should be understood that the exact form of the members 20 and 24 can be varied considerably without departing from the principles of my invention, the particular requirements in this case being that means be provided at that point on the head end of the fish lure whereby a line carrying hooks is releasably held so that the lure is drawn forward with its head end in advance and at the same time will release when a strain as of a fighting fish is applied, or as when a fish strikes at the lure and is hooked.

When a barb or barbs are engaged in a fish, the male member 24 is withdrawn from the cup 20 against the resiliency of the member 24. This action is retarded by the grip of member 24 within socket 20 except when a hook engages a fish of such a size as to provide a sufficient resistance to overcome the normal tension of the member 24.

As the member 24 is dislodged from the socket, the line 40 will also be disengaged from the notch 16 permitting the full weight of the hooked fish to come directly on the line 40 which carries the hook or hooks and thence to the main trolling line 47. A fish so hooked can be "played" in the normal manner and the lure body 10 will not interfere with this operation, due to the fact that the plug body is being dragged through the water in a reverse direction, that is with the tail end leading. If the plug body is formed as shown in Figures 1 and 2, the tapered tail end will facilitate the smooth passage of the body through the water and reduce friction as well as interference for the fisherman.

While I have shown a specific form of means for retaining the line with relation to the forward face 15 of the lure body, it is believed apparent that a multitude of other types of devices can be used, such for example, as a tight helical coil of spring wire that may be suitably supported on the face 15 to permit the line being gripped during the luring or trolling operation, and at the same time permit the release of the line when the lure is struck at and a fish is hooked. There are many other similar simple devices usable at this position, and I do not wish to be limited to the specific form shown, as the scope of the invention is defined by the subjoined claims.

Previously where a lure was provided having a plurality of multiple barbed hooks it was rare indeed when more than one of the barbs of the hooks was engaged in a fish. By using an arrangement according to the principles of my invention shown in the attached drawing, not only is it possible for a fish to be hooked in the mouth by hook 38, but it may also be additionally hooked on the barbs of the hook 36 which can engage the fish adjacent its gills or at a spaced apart position from where the first hook is engaged.

When the fish is hooked the male member 24 shown in the drawing will normally hang freely on the forward part of the line ahead of hook 38.

Because member 24 is of such small size it will not interfere with the playing of the fish or its subsequent disengagement from the hook when it has been landed.

To reset the lure after a fish has been landed or after the plug has been tripped, or when the member 24 has been disengaged from the socket 20, the body 10 is reversed with relation to the main part of the fishing line to bring the face 15 into the forward position directed toward direction of pull on the main trolling line. Member 24 is then reinserted into member 20, and line 40 is also re-engaged in the notch 16. The device is then ready for subsequent trolling operations.

The foregoing description and the accompanying drawing are believed to clearly disclose a preferred embodiment of my invention, but it will be understood that this disclosure is merely illustrative and that such changes in the invention may be made as are fairly within the scope and spirit of the following claims.

I claim:

1. An artificial minnow fish lure comprising a minnow body having a screw eye adjacent its trailing end and a notch on its head end, a socket member having a restricted throat said member being cemented in the head end of said body, a boss releasably engaged in said socket member and including a line guiding eye, and a trolling line attached to said screw eye, said line having a pair of multiple-barbed hooks secured in spaced apart relation along said line to lie intermediate the ends of said body, said line passing forwardly to engagement in said notch and also to pass through the guide eye on the head end of said body.

2. An artificial minnow fish lure comprising a minnow body having a screw eye adjacent its trailing end and a notch on its head end, a socket member associated with the head end of said body and having a restricted throat, a boss releasably engaged in said socket member and including a line guiding eye, and a trolling line attached to said screw eye, said line having a pair of multiple-barbed hooks secured in spaced apart relation along said line to lie intermediate the ends of said body, said line passing forwardly to engagement in said notch and also to pass through the guide eye on the head end of said body.

3. An artificial minnow fish lure comprising a minnow body having anchor means adjacent its trailing end and a notch on its head end, a socket member in the head end of said body and having a restricted throat, a boss releasably engaged in said socket member and including line guiding means, and a trolling line attached to said anchor means, said line having a pair of multiple-barbed hooks secured in spaced apart relation along said line to lie intermediate the ends of said body, said line passing forwardly to engagement in said notch and also to pass through the guide means on the head end of said body.

4. An artificial minnow fish lure comprising a minnow body having anchor means adjacent its trailing end, a socket member associated with the head end of said body and having a restricted throat, a boss releasably engaged in said socket member and including line guiding means, and a trolling line attached to said anchor means, said line having a pair of multiple-barbed hooks secured in spaced apart relation along said line to lie intermediate the ends of said body, said line passing forwardly to engagement with the guide means on the head end of said body.

5. An artificial minnow fish lure comprising a minnow body having anchor means adjacent its trailing end, and a notch in its head end, releasably held line guiding means associated with the head end of said body, and a trolling line attached to said anchor means, said line having a pair of multiple-barbed hooks secured in spaced apart relation along said line intermediate the ends of said body, said line passing forwardly through the guide means on the head end of said body.

6. An artificial minnow fish lure comprising a minnow body having line anchoring means adjacent its trailing end and a forward guide notch on its head end, releasably held line guide means on the head end of said body disposed to the rear of said guide notch when the lure is set for the baiting of fish, and a trolling line attached to said anchor means and having hook means attached thereto, said line also passing through the guide notch and the releasable guide means in a forward direction.

7. An artificial minnow fish lure comprising a minnow body having line anchoring means adjacent its trailing end and a guide notch on its head end, a releasable snap fastener on the head end of said body and having line guiding means thereon, and a trolling line attached to said anchor means and having hook means attached thereto, said line also passing through the guide notch and the releasable guide means in a forward direction.

8. An artificial minnow fish lure comprising a minnow body having line anchoring means adjacent its trailing end, releasable snap fastener on the head end of said body and having line guiding means thereon, and a trolling line attached to said anchor means and having hook means attached thereto, said line also passing through the releasable guide means.

9. An artificial minnow fish lure comprising a minnow body having an anchor eye adjacent its trailing end, releasable line guide means on the head end of said body, and a trolling line attached to said anchor means and having hook means attached thereto, said line also passing through the releasable line guide eye.

10. An artificial minnow fish lure comprising a minnow body having line anchoring means adjacent its trailing end and a guide notch on its forward end, a releasable line guide eye on the head end of said body disposed rearwardly of the guide notch when the lure is set for the baiting of fish, and a trolling line attached to said anchor means and having hook means attached thereto, said line also passing through the releasable guide eye.

OTTO SCHECHTERLE.